United States Patent [19]

Shibasaki et al.

[11] Patent Number: 4,847,109
[45] Date of Patent: Jul. 11, 1989

[54] METHOD OF A MAKING MAGNETIC RECORDING MEDIUM

[75] Inventors: Susumu Shibasaki; Kunio Wakai, both of Ibaraki, Japan

[73] Assignee: Hitachi Maxell, Ltd., Osaka, Japan

[21] Appl. No.: 193,181

[22] Filed: May 10, 1988

Related U.S. Application Data

[63] Continuation of Ser. No. 868,573, May 30, 1986, abandoned.

[30] Foreign Application Priority Data

May 31, 1985 [JP]  Japan .................. 60-119374
May 31, 1985 [JP]  Japan .................. 60-119373
Jun. 17, 1985 [JP]  Japan .................. 60-132625

[51] Int. Cl.⁴ .................. B05D 3/06; B05D 3/12
[52] U.S. Cl. .................. 427/8; 427/39; 427/128; 427/129; 427/130; 427/132; 427/172; 427/177; 427/251; 427/255.2; 427/295; 427/296; 427/322; 427/398.2
[58] Field of Search .................. 427/8, 39, 128, 129, 427/130, 132, 172, 177, 251, 255.2, 295, 296, 322, 398.2

[56] References Cited

U.S. PATENT DOCUMENTS 4,557,944  12/1985  Arai et al. .................. 427/39

FOREIGN PATENT DOCUMENTS 57-164438  10/1982  Japan .
58-17543   2/1983   Japan .
59-24446   2/1984   Japan .

*Primary Examiner*—Bernard Pianalto
*Attorney, Agent, or Firm*—Birch, Stewart, Kolasch & Birch

[57] ABSTRACT

A method of and an apparatus for making a magnetic recording tape, which is free from wrinkles formed thereon, by the use of a vapor deposition technique. A length of tape reeled on a supply reel is taken up by a take-up reel after having passed through a deposition station where it is movably turned around a cylindrical drum. In one aspect, the difference in tension between two different portions of the tape moving between the drum and the take-up reel and on respective sides of a tensioning roll forming a part of at least one tension control mechanism is adjusted to a value not greater than $10N/mm^2$. In another aspect, a charge eraser is employed and installed in the vicinity of the drum for removing an electrostatic charge built up in the tape being moved from the drum onto the take-up reel. In a further aspect, the cylindrical drum is used having its outer peripheral surface roughened to a ten-point average surface roughness of not smaller than 0.1 μm.

14 Claims, 2 Drawing Sheets

METHOD OF A MAKING MAGNETIC RECORDING MEDIUM

This application is a continuation, of application Ser. No. 868,573 filed on May 30, 1986, now abandoned.

BACKGROUND OF THE INVENTION

The present invention relates to the manufacture of a magnetic recording medium having a recording layer made of a ferromagnetic metal layer and, more particularly, to a method of and an apparatus for making the magnetic recording tape free from wrinkles.

A magnetic recording medium, for example, a magnetic recording tape, having a ferromagnetic metallic recording layer is currently manufactured by feeding a base of, for example, polyester or the like from a supply reel towards a take-up reel within a vacuum chamber around a cylindrical drum, and vapor depositing a ferromagnetic material on the base to form the recording layer thereby completing the length of magnetic recording tape. For avoiding the occurrence of wrinkles on the tape, the prior art technique is to adjust the drive torque produced by each of the supply and take-up reels thereby to adjust the tension of the tape travelling from one guide roll to another during the passage thereof from the supply reel onto the take-up reel.

In addition, in order to improve an electrical characteristic of the tape, the one having its surface rendered as smooth as possible is conventionally used. On the other hand, in order to improve thermal contact between the tape and the cylindrical drum during the vacuum vapor depositing so that the temperature of the tape can be favorably controlled, the drum, the outer peripheral surface of which has a ten-point average surface roughness of smaller than 1.0 $\mu$m, is generally utilized.

According to the conventional method wherein only the drive torques of the supply and take-up reels are adjusted to adjust the tension of the tape, in order to avoid thermal damage to the tape and any possible fluctuating run of the tape during the vacuum vapor deposition, a relatively high tension must be imparted to the tape to make a good thermal contact between a portion of the tape and the drum. The application of such a high tension has been found problematic in that not only is the tape wound too tightly on the take-up reel, but also the tape is susceptible to the occurrence of wrinkles.

Also, the use of the drum, having a smooth outer peripheral surface, in combination with the tape having a smooth surface has been found to be a problem. Specifically, in view of the tape being electrostatically charged with reflected and secondary electrons, caused by an electronic gun used to evaporate the ferromagnetic material, and/or by the effect of friction between the tape and any one of the guide rolls, the tape tends to stick to the cylindrical drum as well as the guide rolls to such an extent as to result in the fluctuating run of the tape, thereby rendering the tape susceptible to the occurrence of wrinkles. In particular, since the opposite side edge portions of the tape are not only insufficiently tensioned, but also are easy to be electrostatically charged with the result that a smooth relative slip may not occur between the tape and the cylindrical drum, the tape tends to be wound onto the take-up reel in the form wherein opposite side edge portions thereof are curled or buckled, resulting in the occurrence of wrinkles.

Furthermore, the use of a drum of which the outer peripheral surface has a ten-point average surface roughness smaller than 0.1 $\mu$m as measured according to Japan Industrial Standard (JIS) B 0601 has the following problem.

As is well known to those skilled in the art, the surface of the length of magnetic recording tape opposite to the recording layer formed by depositing the ferromagnetic material is very smooth. On the other hand, the outer peripheral surface of the cylindrical drum hitherto used is also very smooth and is normally cooled to about $-20°$ C. during the manufacture of the magnetic recording tape. Therefore, considering that, during the deposit of the ferromagnetic material within the vacuum chamber, the base is cooled in contract with the drum and, on the other hand, heated in contact with vapor of the ferromagnetic material which is usually about 2,000° C. in temperature. With the base so exposed to the severe conditions within the vacuum chamber, the tape undergoes cyclic contraction and elongation during its passage around the drum and, therefore, a smooth slip of the tape relative to the drum is often hampered. This in turn constitutes a cause of strain in the tape leading to the occurrence of wrinkles on the length of magnetic recording tape.

SUMMARY OF THE INVENTION

The present invention has been developed with a view to substantially eliminating the above discussed problems and has been developed for its essential object to provide an improved apparatus effective to manufacture the magnetic recording tape substantially free from wrinkles.

Another important object of the present invention is to provide an improved method that is practiced by the apparatus of the type referred to above.

According to one aspect of the present invention, the formation of wrinkles on the tape is minimized by the provision of at least one tension control mechanism comprising a tensioning roll and a pair of tension sensors disposed within the vacuum chamber on respective sides of the tensioning rolls. The tension sensors serve to detect the tension of different portions of the tape over the tensioning roll, respectively, and the tensioning roll is operated to adjust the difference in tension between those different portions of the tape to a value not greater than 10 Newtons (N)/mm². As defined in The American Heritage Dictionary, the term "newton", symbolized by the abbreviation "N", is the unit of force required to accelerate a mass of one kilogram one meter per second per second. It is equal to 100,000 dynes.

According to another aspect of the present invention, the occurrence of wrinkles on the tape can be minimized by the provision of a charge eraser for removing an electrostatic charge built up in the tape. The charge eraser may comprise either a magnetron sputtering discharge unit or at least one glow discharge unit. Preferably, the charge eraser is installed on the trailing side of the vacuum vapor-depositing station with respect to the direction of run of the tape towards the take-up reel.

According to a further aspect of the present invention, the occurrence of wrinkles on the tape is minimized by the utilization of the cylindrical drum of which outer peripheral surface is roughened so as to have a ten-point average roughness of not smaller than 0.1 $\mu$m.

According to the present invention, the formation of wrinkles can be further minimized if two or all of the tension control mechanism, the charge eraser and the surface-roughened drum are utilized in combination.

BRIEF DESCRIPTION OF THE DRAWINGS

These and other objects and features of the present invention will become clear from the following description taken in conjunction with the preferred embodiment of the present invention and with reference to the accompanying drawings, in which.

DETAILED DESCRIPTION OF THE INVENTION

Figure 1:
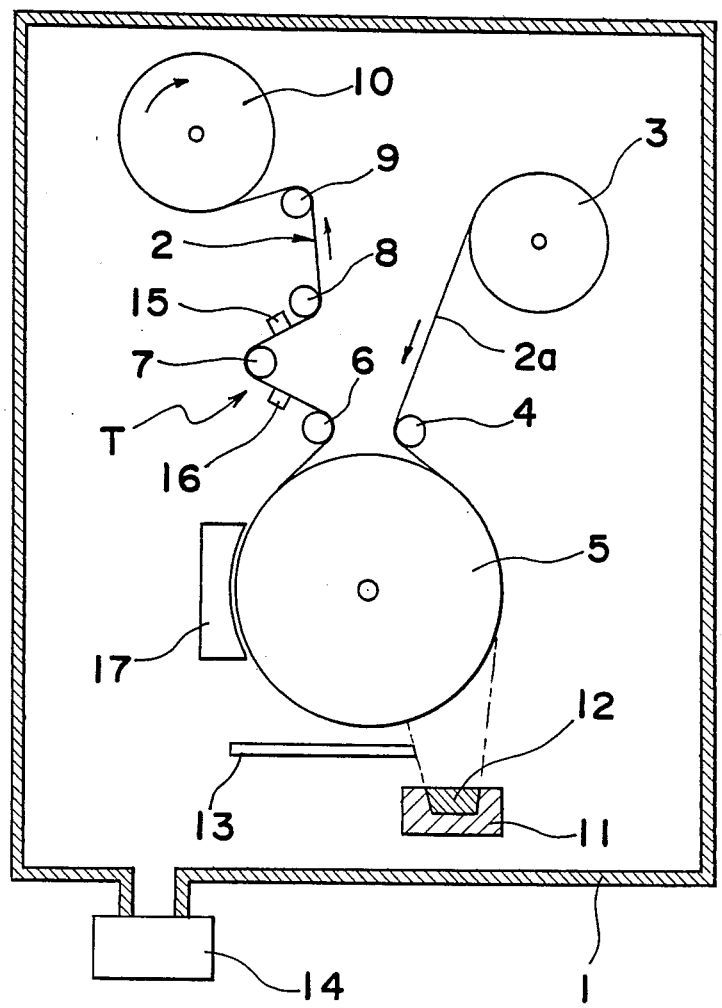
FIG. 1 is a schematic side sectional view of a vacuum depositing apparatus embodying the present invention.

Referring to FIG. 1, a magnetic recording tape 2 comprising a strip-like base 2a and a recording layer formed on one surface of the base by depositing a thin film of ferromagnetic metal can be fabricated within a vacuum chamber 1. Specifically, the vacuum chamber 1 is communicated with any known vacuum source 14, for example, an oil diffusion vacuum pump, to enable a substantial vacuum to be established and maintained within the vacuum chamber 1.

The base 2a of the magnetic recording tape 2 may be made of any known film of plastics such as, for example, polyester, polyimide, or polyamide, or non-magnetizeable metallic material such as, for example, copper.

The recording layer deposited on the base 2a to complete the magnetic recording tape 2 may be made of any known ferromagnetic material including an element, or an alloy or an oxide, of cobalt, nickel or iron, or an alloyed ferromagnetic material such as, for example, Co-P alloy or Co-Ni-P alloy.

Within the vacuum chamber 1, a roll of base 2a is supported on a supply reel 3 from which a length of web 2a extends towards a motor-driven take-up reel 10 after having been turned around a cylindrical drum or guide bed 5 positioned generally below the supply and take-up reels 3 and 10. A plurality of guide rolls 4, 6, 8 and 9 for guiding the travel of the base 2a from the reel 3 to the reel 10 around the cylindrical drum 5 are arranged along a path of movement of the base 2a between the reel 3 to the reel 10, the guide roll 4 being positioned between the supply reel 3 and the drum 5 whereas the guide rolls 6, 8 and 9 are positioned between the drum 5 and the reel 10. It is to be noted that the guide rolls 4 and 6 are so positioned relative to each other and also to the drum 5 that a portion of the base 2a turned around the drum 5 can extend around the drum 5 in a fashion generally similar to the inverted shape of a figure "Ω".

Arranged generally below the cylindrical drum 5 is an evaporation source 11 and a shield plate 13 making up a depositing station. This evaporation source 11 and the shield plate 13 are so positioned that vapor of an evaporant 12, that is, a ferromagnetic material, which is evaporated from the evaporation source 11, can be deposited on a consecutive portion of the base 2a, then moved around the cylindrical drum 5 past the depositing station, at an oblique angle delimited by the shield plate 13. With the base 2a so consecutively deposited with the evaporant 12, the magnetic recording tape 2 is formed which is subsequently taken up by the take-up reel 10.

In order to minimize, or substantially eliminate, the occurrence of wrinkles on the length of magnetic recording tape 2, at least three methods can be contemplated according to the present invention. One of these methods is to use a tension control mechanism, another one of them is to use a charge eraser, and the remaining method is to use the cylindrical drum 5 having its outer peripheral surface roughened. It is, however, to be noted that the present invention is not limited to the use of one of these methods in one vacuum chamber, but may be practiced by the use of a combination of two or all of these methods in the vacuum chamber 1.

The method wherein the tension control mechanism is used will first be described. The tension control mechanism employed in the vacuum chamber 1 is generally identified by T and is positioned between the guide rolls 6 and 8. This tension control mechanism T comprises a tensioning roll 7, supported for displacement in a direction generally perpendicular to the direction of travel of the length of magnetic recording tape 2 between the guide rolls 6 and 8, and a pair of tension sensors 15 and 16 disposed between the guide roll 8 and the tensioning roll 7 and between the guide roll 6 and the tensioning roll 7, respectively. The tension sensor 16 is used to detect, and generate an electric signal indicative of the tension of a leading portion of the length of magnetic recording tape 2 running on the leading side of the tensioning roll 7 with respect to the direction of travel of the length of magnetic recording tape 2 towards the take-up reel 10, whereas the tension sensor 15 is used to detect and generate an electric signal indicative of the tension of a leading portion of the tape 2 running on the leading side thereof with respect to that towards the take-up reel 10.

The respective electric signals from the tension sensors 15 and 16 are fed to any suitable control so designed as to control one or both of the number of revolutions of the tensioning roll 7 and the position of the tensioning roll 7 relative to that portion of the tape 2 between the guide rolls 6 and 8 so that the difference between the tensions detected respectively by the tension sensors 15 and 16 can be substantially maintained at a value not greater than 10 N/mm$^2$. Accordingly, the length of magnetic recording tape 2 travelling between the drum 5 and the take-up reel 10, that is, the base 2a which has been deposited with the ferromagnetic material at the depositing station and which has been subsequently pulled towards the take-up reel 10 is controlled without being excessively expanded widthwise by the effect of the greater difference in tension, thereby avoiding any possible occurrence of wrinkles on the tape 2.

On the contrary thereto, where the tension of a portion of the tape 2 between the tensioning roll 7 and the take-up reel 10 is low as compared with that of a portion of the tape 2 between the drum 5 and the tensioning roll 7 with the difference therebetween being greater than 10 N/mm$^2$, the portion of the tape 2 which has been shrinked widthwise during the travel from the drum 5 towards the tensioning roll 7 tends to expand widthwise as it has passed over the tensioning roll 7. However, since at this time no slip occurs between the tape 2 and the tensioning roll 7, strain occurs in the tape 2 which brings about the wrinkles on the tape 2.

It is to be noted that, although the use of the only tension control mechanism T including the tensioning roll 7 disposed between the guide rolls 6 and 8 is effective enough to avoid the occurrence of wrinkles on the tape 2, the use of a plurality of the tension control mechanisms between the drum 5 and the take-up reel 10 is effective to minimize the difference in tension between the trailing and leading sides with respect to the tensioning roll 7 and also to further minimize the expansion of the tape 2 in the widthwise direction, thereby further minimizing the possibility of occurrence of the wrinkles on the resultant magnetic recording tape.

PREFERRED EMBODIMENTS

The above described method utilizing at least one tension control mechanism T according to the present invention will now be illustrated by way of example.

EXAMPLE I

With the use of a vacuum vapor-depositing apparatus wherein the tension control mechanism comprising the guide rolls 6 and 8 and the tensioning roll 7 is disposed between the cylindrical drum 5 and the take-up reel 10, and the tension sensors 15 and 16 are disposed on the trailing and leading sides, respectively, of the tensioning roll 7 with respect to the direction of travel of the tape as shown in FIG. 1, a length of polyester film 2a, 10 μm in thickness and 500 mm in width, was set to extend from the supply reel 3 to the cylindrical drum 5 via the guide roll 4 and then from the drum 5 to the take-up reel 10 via the guide roll 6, then the tensioning roll 7, the guide roll 8 and finally the guide roll 9 in a manner as shown in FIG. 1. Co-Ni alloy containing 85 wt % of cobalt and 15 wt % of nickel was then placed as the ferromagnetic material 12 in the evaporation source 11, followed by the activation of the vacuum source 14 to establish and maintain vacuum pressure of $5 \times 10^{-5}$ mbar within the chamber 1. Thereafter, the length of polyester film 2a was moved from the supply reel 3 onto the take-up reel 10 at a velocity of 10 m per minute past the depositing station at which the recording layer of ferromagnetic material, that is, Co-Ni alloy, having a thickness of 1,000 Å was formed on the length of polyester film 2a by heating the ferromagnetic material 12 with the use of an electron gun to cause the evaporant alloy to vapor deposit on the length of polyester film 2a. While at this time the tension at the supply reel 3 and that at the take-up reel 10 were set to 150 Newtons (N) and 10 Newtons (N), respectively, the relationship between the occurrence of wrinkles on the tape 2 moving over the tensioning roll 7 and the difference in tension of the tape 2 at the leading and trailing sides of the tensioning roll 7 was studied with the load at the tensioning roll 7 varied every 10 Newtons (N) by the use of a suitable linkage system, the result of the study being shown in Table 1.

TABLE 1

| Difference in Tension Newtons (N) | Percentage of Occurrence of Wrinkles |
| --- | --- |
| 10 | 0 |
| 20 | 0 |
| 30 | 0 |
| 40 | 0 |
| 50 | 0 |
| 60 | 50 |
| 70 | 80 |
| 80 | 100 |
| 90 | 100 |

TABLE 1-continued

| Difference in Tension Newtons (N) | Percentage of Occurrence of Wrinkles |
| --- | --- |
| 100 | 100 |

From the foregoing, it has now become clear that when the difference in tension is greater than 50 N, wrinkles are formed on the length of magnetic recording tape, but they are not formed when it is smaller than 50 N. This illustrates that, when the difference between the tension of the portion of the tape on the leading side with respect to the tensioning member and that on the trailing side with respect to the same tensioning member is selected to be not greater than 10 $N/mm^2$ with the thickness and the width of the base being taken into consideration, the expansion of the base can be effectively suppressed, and consequently the possible occurrence of wrinkles on the tape during the manufacture thereof can be effectively minimized.

Figure 2:
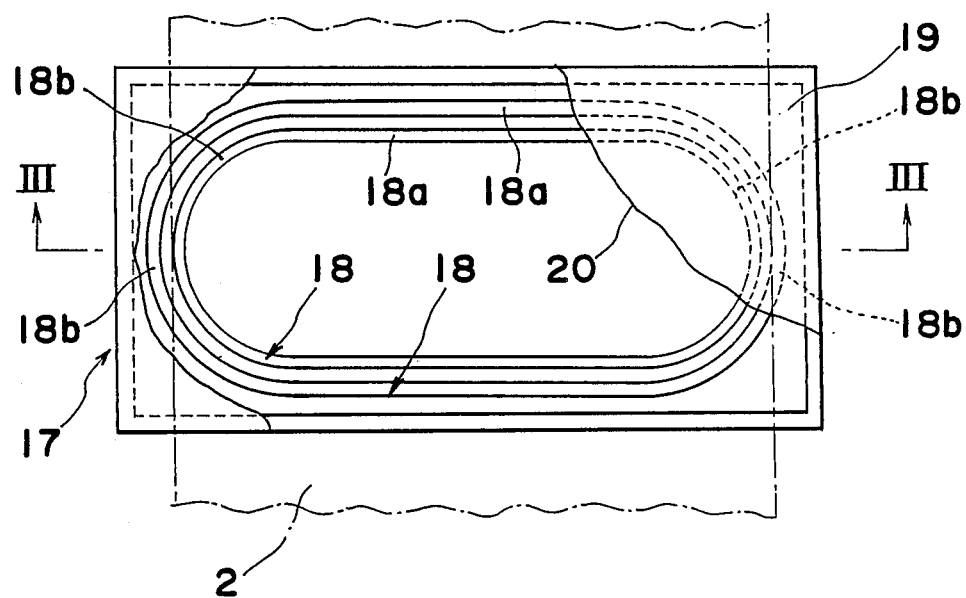
FIG. 2 is a schematic front elevational view, on an enlarged scale, of a magnetron sputtering discharge unit used in the apparatus.
Figure 3:
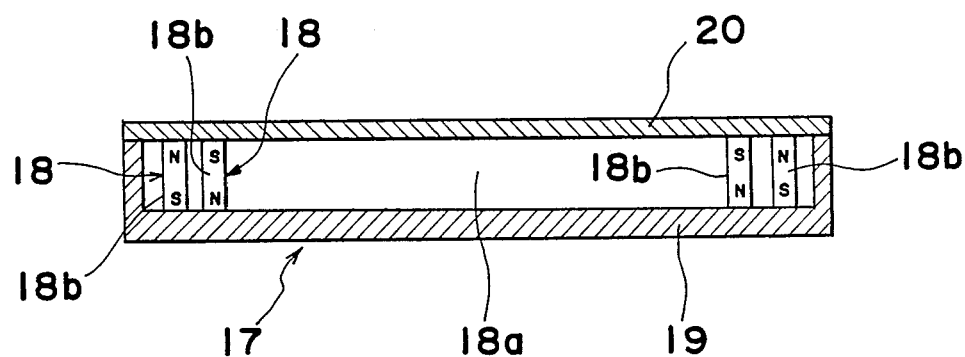
FIG. 3 is a cross-sectional view taken along the line III—III in FIG. 2.

The method utilizing the charge eraser for ultimately minimizing the occurrence of the wrinkles on the length of magnetic recording tape will now be described. The charge eraser employed in the instance as shown comprises a magnetron discharge unit 17 disposed in the vicinity of the outer periphery of the drum 5 on the trailing side with respect to the direction of travel of the tape 2 and positioned between the shield plate 13 and the guide roll 6 as shown in FIG. 1. The discharge unit 17, the details of which are shown in FIGS. 2 and 3, comprises generally elliptical magnets 18 supported one inside the other within a generally rectangular support structure 19, each of the magnets 18 having a pair of opposite straight portions 18a and a pair of opposite rounded portions 18b. The support structure 19 having the magnets 18 with their long axes aligned with the longitudinal sense of the support structure 19 is so positioned relative to the drum 5 that the pairs of the opposite rounded portions 18b of the respective magnets 18 can confront the opposite edge portions of the tape 2 while the pairs of the straight portions 18a thereof can confront a central area of the tape 2 intermediate between the opposite side edge portions. The support structure 19 with the magnets 18 accommodated, one inside the other therein, is fitted with a target 20 contacting both an N-pole of the outside magnet 18 and an S-pole of the inside magnet 18 as best shown in FIG. 3. When the discharge unit 17 of the above described construction is in operation, the drum 5 serves as an earth electrode, and a discharge takes place between the drum 5 and the discharge unit 17.

Accordingly, the discharge treatment performed by the use of the magnetron sputtering discharge unit 17 is effective to suppress a build-up of electrostatic charge at the opposite side edge portions of the tape 2 because the magnetic field can be intensively developed at respective areas aligned with the opposite side edge portions of the tape 2 and, therefore, the discharge can take place considerably at the opposite side edge portions of the tape 2. As a result of this, the electrostatic charge built up in the tape 2, particularly at the opposite side edge portions of the tape 2, can be effectively suppressed as the tape 2 being wound onto the take-up reel 10 is moved past a clearance between the discharge unit 17 and the drum 5, and therefore, the tape 2 can be wound onto the take-up reel 10 without the opposite side edge portions tending to curl. Thus, the occurrence of the wrinkles on the tape 2 can be effectively minimized.

Although in the foregoing description, the charge eraser has been described as comprising the magnetron sputtering discharge unit 17, it may comprise one or a plurality of, for example, three glow discharge units. Where the three glow discharge units are employed, they should be arranged in a row traversing the tape 2 so that two of them can confront the opposite side edge portions of the tape to increase a discharge density for each side edge portion while the remaining one can confront the central area of the same length of tape 2. The use of one or three glow discharge units brings about the same effect as brought about by the use of the magnetron discharge unit shown in and described with particular reference to FIGS. 2 and 3.

Hereinafter, the method utilizing the charge eraser will be illustrated by way of example.

EXAMPLE II

With the use of the vacuum depositing apparatus of a construction similar to that shown in FIG. 1, but having neither the guide rolls 8 and 9 nor the tension control mechanism T employed, a length of polyester film 2a, 10 μm in thickness and 500 mm in width, was set to extend from the supply reel 3 to the cylindrical drum 5 via the guide roll 4 and then from the drum 5 to the take-up reel 10 via the guide roll 6. Co-Ni alloy containing 85 wt % of cobalt and 15 wt % of nickel was then placed as the ferromagnetic material 12 in the evaporation source 11, followed by the activation of the vacuum source 14 to establish and maintain a vacuum pressure of $5 \times 10^{-5}$ mbar within the chamber 1. Thereafter, the length of polyester film 2a was moved from the supply reel 3 onto the take-up reel 10 at a velocity of 10 m per minute past the depositing station at which the recording layer of ferromagnetic material, that is, Co-Ni alloy, having a thickness of 1,200 Å, was formed on the length of polyester film 2a by heating the ferromagnetic material 12 with the use of an electron gun to cause the evaporation alloy to vapor deposit on the length of polyester film 2a.

The magnetron discharge unit 17 was disposed in the vicinity of, spaced 15 cm from, the outer periphery of the drum 5 and positioned between the shield plate and the guide roll 6 on the trailing side with respect to the direction of travel of the tape 2. Using this discharge unit 17, and by supplying an electric power of 2 kW to an alternating current electrode, a discharge treatment was carried out while the tape 2 was continuously moved through the clearance between the discharge unit 17 and the drum 5. As a result, no tendency of the opposite side edge portions of the tape 2 so formed to curl was found and, therefore, the tape 2 was found having no wrinkles formed over the entire length thereof.

EXAMPLE III

Except that in place of the magnetron discharge unit three glow discharge units were used and arranged in a row traversing the tape 2 in alignment with the opposite side edge portions and central portion of the tape 2, respectively, the same apparatus as in Example II was used and operated in the same manner as in Example II. As a result, no tendency of the opposite edge portions of the tape 2 to curl was found and, therefore, the tape 2 was found having no wrinkles formed over the entire length thereof.

EXAMPLE IV

Except that in place of the magnetron discharge unit one glow discharge unit was employed and positioned so as to confront the central portion of the tape 2, the same apparatus as in Example II was used and operated in the same manner as in Example II. As a result, no wrinkle was found as formed in the tape 2 except for the opposite side edge portions thereof. However, when the tape 2 had been wound in 2,000 m around the take-up reel 10, the tendency of the opposite side edge portions of the tape 2 to curl was found and, therefore, slight wrinkles were found adjacent the opposite side edge portions of the tape 2.

COMPARISON I

Using the apparatus similar to that used in Example II, but having not been provided with any charge eraser, the apparatus was operated in the same manner as in Example II. As a result, when the tape 2 had been wound in 2,000 m around the take-up reel 10, the opposite side edge portions of the tape 2 were found as having curled 5 mm and, therefore, considerable wrinkles were found thereat.

As can be understood from the comparison between each of Examples II and IV and Comparison I, the length of magnetic recording tape tends to have wrinkles formed thereon where no discharge treatment is effected to the tape during the passage thereof from the drum towards the take-up reel. In contrast thereto, where the discharge treatment is effected to the length of magnetic recording tape by the use of the glow discharge units in such a way as to increase the discharge density at each of the opposite side edge portions of the tape being moved around the drum subsequent to the deposit of the ferromagnetic material or where the discharge treatment is effected to the length of magnetic recording tape by the use of the magnetron discharge unit, no occurrence of wrinkles is substantially found on the length of magnetic recording tape. Slight wrinkles may be found as occurred at portions adjacent the side edges of the length of magnetic recording tape where the only glow discharge unit is employed to effect the discharge treatment uniformly to the length of magnetic recording tape.

In any event, where the discharge treatment is effected in any manner according to the present invention, the electrostatic charge built up in the length of magnetic recording tape can be effectively suppressed with no possibility of the opposite side edge portions being curled, and therefore, the occurrence of the wrinkles on the length of magnetic recording tape can be advantageously minimized.

As hereinbefore, the formation of the wrinkles on the length of magnetic recording tape can also be minimized by the employment of the cylindrical drum having its outer peripheral surface roughened. This method will now be described.

As is well known to those skilled in the art, the surface of the length of magnetic recording tape opposite to the recording layer formed by depositing the ferromagnetic material is very smooth. On the other hand, the outer peripheral surface of the cylindrical drum hitherto used is also very smooth and is normally cooled to about −20° C. during the manufacture of the magnetic recording tape. Therefore, considering that, during the deposit of the ferromagnetic material within the vacuum chamber, the base is cooled in contact with the drum and, on the other hand, heated in contact with vapor of the ferromagnetic material which is usually about 2,000° C. in temperature. With the base so exposed to the severe conditions within the vacuum chamber, the tape undergoes cyclic shrinkage and expansion during its passage around the drum and, therefore, a smooth slip of the tape relative to the drum is often hampered. This in turn constitutes a cause of strain in the tape leading to the occurrence of wrinkles on the length of magnetic recording tape.

In accordance with the present invention, in order for the tape being moved around the drum to undergo a surface slip thereby to minimize the strain on the tape, the outer peripheral surface of the drum 5 is roughened to have a ten-point average roughness of 0.1 to 10 μm as measured according to the method stipulated in JIS B 0601 (Japan Industrial Standard). Where the outer peripheral surface of the drum has a ten-point average roughness of not smaller than 0.1 μm, the tape 2 can positively undergo a surface slip relative to the drum 5 during the passage thereof around the drum 5 and, accordingly, no strain develop substantially in the tape even though it cyclically expands and shrinks under the influence of the elevated temperature of the evaporant vapor and the extremely low temperature of the drum 5, thereby avoiding the possibility of formation of wrinkles on the tape.

On the contrary, where the outer peripheral surface of the drum 5 has a ten-point average roughness of smaller than 0.1 μm, the surface slip between the tape and the drum will not take place smoothly and, therefore, strain tends to occur in the tape during the passage thereof around the drum because of the expansion thereof under the influence of the elevated temperature, with the result that wrinkles tend to be formed on the tape.

The more rough the outer peripheral surface of the drum 5, the more enhanced the surface slip between the tape and the drum. However, if the ten-point average roughness of the outer peripheral surface of the drum 5 is greater than 10 μm, the outer peripheral surface of the drum 5 is so roughened that thermal contact between the tape and the outer peripheral surface of the drum 5 then cooled will be hampered and, consequently, rather than the tape being satisfactorily cooled in contact with the drum, the tape may receive thermal damage under the influence of heat of elevated temperature radiated from the evaporation source 11. Accordingly, the ten-point average roughness of the outer peripheral surface of the drum 5 is preferred to be within the range of 0.1 to 10 μm.

The cylindrical drum 5 having its outer peripheral surface of the predetermined roughness can be made by forming a hard chromium plating, or a hard nickel plating, on the outer peripheral surface of a cylindrical roll made of iron or aluminum and then adjusting the outer surface of the plating on the roll to the predetermined roughness. Alternatively, it can be made by nitriding the outer peripheral surface of a cylindrical roll made of stainless steel, or coating a nitride or carbides of, for example, titanium on the outer peripheral surface of a cylindrical roll made of iron, aluminum or stainless steel, and then adjusting the outer surface of the nitrided or coated layer to the predetermined roughness.

The method utilizing the drum having the roughened outer peripheral surface will now be illustrated by way of example.

EXAMPLE V

With the use of the vacuum depositing apparatus of a construction similar to that shown in FIG. 1, but having neither guide rolls 8 and 9, the tension control mechanism T, nor the charge eraser 17 employed, and having the drum of which outer peripheral surface had been roughened to a different ten-point average roughness as tabulated in Table 2, a length of polyester film 2a, 11 μm in thickness, 125 mm in width and 0.1 μm in surface roughness, was set to extend from the supply reel 3 to the cylindrical drum 5 via the guide roll 4 and then from the drum 5 to the take-up reel 10 via the guide roll 6. Co-Ni alloy containing 85 wt % of cobalt and 15 wt % nickel was then placed as the ferromagnetic material 12 in the evaporation source 11, followed by the activation of the vacuum source 14 to establish and maintain a vacuum pressure of $6.6 \times 10^{-5}$ mbar within the chamber 1. Thereafter, the length of polyester film 2a was moved from the supply reel 3 onto the take-up reel 10 at a velocity of 10 m per minute around the drum 5, then cooled to have a surface temperature of −20° C., past the depositing station at which the recording layer of ferromagnetic material, that is, Co-Ni alloy, having a thickness of 0.12 μm was formed on the length of polyester film 2a by heating the evaporation source 11 with the use of an electron gun to cause the evaporant alloy to vapor deposit on the length of polyester film 2a.

Examination of the length of magnetic recording tape so formed according to this method has indicated such results as shown in Table 2.

TABLE 2

| When the surface roughness on the drum was: | Wrinkles on the tape were: |
| --- | --- |
| 5.0 μm | Not occurred |
| 1.0 μm | Not occurred |
| 0.5 μm | Not occurred |
| 0.1 μm | Not occurred |
| 0.01 μm | Formed |

Thus, it has now become clear that, although the wrinkles are occurred on the length of magnetic recording tape when the ten-point average surface roughness of the drum is smaller than 0.1 μm, no wrinkle is formed when it is not smaller than 0.1 μm.

Although the present invention has fully been described in connection with the preferred embodiment with reference to the accompanying drawings it is to be noted that various changes and modifications are apparent to those skilled in the art. By way of example, the drum 5 may be supported for rotation in one direction conforming to the direction of travel of the tape, and in this case, the drum 5 is to be rotated at a peripheral velocity equal to the velocity of travel of the tape being wound onto the take-up reel. In practice, while the take-up reel 10 is motor-driven, the supply reel 3 is freely rotatably supported, but has imparted thereto a suitable friction to avoid any possible loosening of the tape drawn therefrom.

Instead of the use of the cylindrical drum, a fixedly supported guide plate or any other suitable guide bed may be employed for guiding the base past the depositing station.

Some or all of the rolls 4, 6, 8 and 9 may be an idle roll mounted freely rotatably on a respective shaft. Alternatively, some or all of these rolls may be rotatably mounted through a respective bearing sleeve on a respective shaft which is drivingly coupled through a transmission system with a drive motor for driving the take-up reel.

Each of the tension sensors 15 and 16 is of a type capable of measuring the tension in terms of change in photoelastic effect. However, it may be of a type capable of detecting the lateral displacement of the associated guide rolls 8 or 6 resulting from a change in tension of the tape travelling over such associated guide roll.

Furthermore, two or all of the three methods herein disclosed for the purpose of the present invention may be combined together, and the vacuum depositing apparatus could be correspondingly modified so as to perform the combined version of these methods.

Accordingly, such changes and modifications are to be understood as included within the true scope of the present invention as defined by the appended claims unless they depart therefrom.

What is claimed is:

1. A method for manufacturing a wrinkle free magnetic recording medium within a vacuum chamber, which comprises the steps of:

transporting a tape from a supply reel to a take-up reel past a vaporization station at which station said tape is guided over an outer peripheral surface of a cylindrical drum, said supply and take-up reels and said cylindrical drum all being supported within a single vacuum chamber;

depositing a ferromagnetic recording layer on said tape at said vaporization station by vapor deposition of a ferromagnetic material to form said magnetic recording medium;

providing a means for controlling tension on said tape magnetic recording medium including a first guide roll, a tensioning roll and a second guide roll and means for measuring and comparing said tension on said tape recording medium before and after said tensioning roll and for adjusting said tension to a predetermined value; and controlling and adjusting said tension on said tape recording medium by measuring said tension of a first portion of said tape after it has left said cylindrical drum between said first guide roll and said tensioning roll and measuring the tension of a second portion of said tape between said tensioning roll and said second guide roll, said first and second guide rolls and said tensioning roll being disposed between said cylindrical drum and said take-up reel and adjusting said tension measured on said first and second portions of said tape to said predetermined value, not greater than 10 Newtons/mm².

2. The method of claim 1, further including the step of removing electrostatic charge built up in said tape subsequent to said vaporization station.

3. The method of claim 2, wherein said cylindrical drum has said outer peripheral surface roughened to a ten-point average surface roughness of not less than 0.1 m.

4. The method of claim 2, further including substantially simultaneously cooling said tape during said charge removal step by cooling said cylindrical drum at the location of contact between said tape and said drum at the site of charge removal.

5. The method of claim 1, wherein said cylindrical drum has said outer peripheral surface roughened to a ten-point average surface roughness of not less than 0.1 m.

6. A method for manufacturing a wrinkle free magnetic recording medium within a vacuum chamber, which comprises the steps of:

transporting a tape from a supply reel to a take-up reel past a vaporization station at which station said tape is guided over an outer peripheral surface of a cylindrical drum, said supply and take-up reels and said cylindrical drum all being supported within a single vacuum chamber;

depositing a recording layer of ferromagnetic material on said tape at said vaporization station by vapor deposition to form said magnetic recording medium;

removing electrostatic charge build up in said tape as said tape is guided by said cylindrical drum between said vaporization station and said take-up reel; and substantially simultaneously cooling said tape during said charge removal by cooling said cylindrical drum at the location of contact between said tape and said drum at the site of said charge removal.

7. The method of claim 6, wherein said electrostatic charge build up is removed by a glow discharge unit.

8. The method of claim 7, wherein glow discharge by said glow discharge unit is carried out such that discharge density is increased specifically at each opposite side edge portion of said tape having said ferromagnetic recording layer formed thereon.

9. The method of claim 6, wherein removal of electrostatic charge build up is carried out by a magnetron discharge unit.

10. The method of claim 6, wherein said drum is cooled to a surface temperature of about $-20°$ C. at said charge removal site.

11. The method of claim 6, wherein said cylindrical drum has said outer peripheral surface roughened to a ten-point average surface roughness of not less than 0.1 m.

12. The method of claim 11, wherein said electrostatic charge build up is removed by a glow discharge unit by increasing discharge density specifically at side edges of said tape.

13. The method of claim 6, further including the steps of:

providing a means for controlling tension on said tape magnetic recording medium including a first guide roll, a tensioning roll and a second guide roll and means for measuring and comparing said tension on said tape recording medium before and after said tensioning roll and for adjusting said tension to a predetermined value; and controlling and adjusting said tension on said tape recording medium by measuring said tension of a first portion of said tape after it has left said cylindrical drum between said first guide roll and said tensioning roll and measuring the tension of a second portion of said tape between said tensioning roll and said second guide roll, said first and second guide rolls and said tensioning roll being disposed between said cylindrical drum and said take-up reel and adjusting said tension measured on said first and second portions of said tape to said predetermined value, not greater than 10 Newtons/mm².

14. A method for manufacturing a wrinkle free magnetic recording medium within a vacuum chamber, which comprises the steps of:

transporting a tape from a supply reel to a take-up reel past a vaporization station at which station said tape is guided over an outer peripheral surface of a cylindrical drum, said supply and take-up reels and said cylindrical drum all being supported within a single vacuum chamber;

depositing a ferromagnetic recording layer on said tape at said vaporization station by vapor deposition of a ferromagnetic material to form said magnetic recording medium;

providing a means for controlling tension on said tape magnetic recording medium including a first guide roll, a tensioning roll and a second guide roll and means for measuring and comparing said tension on said tape recording medium before and after said tensioning roll and for adjusting said tension to a predetermined value;

controlling and adjusting said tension on said tape recording medium by measuring said tension of a first portion of said tape after it has left said cylindrical drum between said first guide roll and said tensioning roll and measuring the tension of a second portion of said tape between said tensioning roll and said second guide roll, said first and second guide rolls and said tensioning roll being disposed between said cylindrical drum and said take-up reel and adjusting said tension measured on said first and second portions of said tape to said predetermined value, not greater than 10 Newtons/mm$^2$;

removing electrostatic charge build up in said tape as said tape is guided by said cylindrical drum between said vaporization station and said take-up reel;

substantially simultaneously cooling said tape during said charge removal by cooling said cylindrical drum at the location of contact between said tape and said drum at the site of said charge removal; and wherein said cylindrical drum has said outer peripheral surface roughened to a ten-point average surface roughness of not less than 0.1 μm.

* * * * *